US012532139B2

(12) United States Patent
Lee et al.

(10) Patent No.: US 12,532,139 B2
(45) Date of Patent: Jan. 20, 2026

(54) AUDIO SIGNAL PROCESSING METHOD AND AUDIO SIGNAL PROCESSING APPARATUS

(71) Applicants: Peng Lee, New Taipei (TW); Li-Hao Yang, New Taipei (TW)

(72) Inventors: Peng Lee, New Taipei (TW); Li-Hao Yang, New Taipei (TW)

(73) Assignee: XROUND INC., New Taipei (TW)

( * ) Notice: Subject to any disclaimer, the term of this patent is extended or adjusted under 35 U.S.C. 154(b) by 53 days.

(21) Appl. No.: 17/716,339

(22) Filed: Apr. 8, 2022

(65) Prior Publication Data

US 2022/0329957 A1 Oct. 13, 2022

(30) Foreign Application Priority Data

Apr. 10, 2021 (TW) ................................ 110113007

(51) Int. Cl.
*H04S 3/00* (2006.01)
*H04R 3/04* (2006.01)

(52) U.S. Cl.
CPC ............... *H04S 3/002* (2013.01); *H04R 3/04* (2013.01); *H04S 3/008* (2013.01); *H04S 2400/01* (2013.01); *H04S 2400/05* (2013.01); *H04S 2420/01* (2013.01)

(58) Field of Classification Search
CPC ...... H04S 3/002; H04S 3/008; H04S 2400/01; H04S 2400/05; H04S 2420/01; H04R 3/04
See application file for complete search history.

(56) References Cited

U.S. PATENT DOCUMENTS 6,447,461 B1 * 9/2002 Eldon .................... A61B 5/121 73/585
2007/0076902 A1 * 4/2007 Master ...................... H04S 7/00 381/94.3
2007/0230725 A1 * 10/2007 Wang ........................ H04S 3/02 381/17
2007/0270988 A1 * 11/2007 Goldstein ................ H04R 5/04 381/309
2008/0235006 A1 * 9/2008 Pang ....................... H04S 3/008 704/201
2009/0116657 A1 * 5/2009 Edwards ................ H04R 25/70 381/60
2009/0296944 A1 * 12/2009 Edwards ................ H04R 25/43 381/23.1
2012/0213375 A1 * 8/2012 Mahabub .................. H04S 5/00 381/17
2013/0108096 A1 * 5/2013 Fitz ...................... H04R 25/554 381/320

(Continued)

*Primary Examiner* — Daniel R Sellers

(57) ABSTRACT

An audio signal processing method is provided. The method separates a left and a right channel audio signal to a center-left and center-right channel audio signals, and a side-left and side-right channel audio signals, and processes the center and side channel audio signals by a Head Related Transfer Function (HRTF) so as to simulate the audio signals into several audio source positions related to a user, then synthesizes the processed audio signals into dual channel audio signals according to the user's hearing characteristics by a frequency compensation process. The invention further provides an audio signal processing apparatus to perform the audio signal processing method.

10 Claims, 3 Drawing Sheets

(56) References Cited

U.S. PATENT DOCUMENTS

| | | | | |
|---|---|---|---|---|
| 2013/0294605 | A1* | 11/2013 | Hagioka .................. | H04R 5/00<br>381/17 |
| 2019/0394583 | A1* | 12/2019 | Tan ......................... | H04S 3/008 |
| 2020/0037056 | A1* | 1/2020 | Clark ..................... | H04R 25/48 |

* cited by examiner

AUDIO SIGNAL PROCESSING METHOD AND AUDIO SIGNAL PROCESSING APPARATUS

CROSS REFERENCE TO RELATED APPLICATION

The present application claims priority to Taiwan patent application Serial No. 110113007 filed on Apr. 10, 2021, the entire content of which is incorporated by reference to this application.

BACKGROUND OF THE INVENTION

1. Field of the Invention

The present invention pertains to an audio signal processing technology, more specifically to an audio signal processing method and an audio signal processing apparatus for simulating a dual channel audio signal into a multi-channel audio signal.

2. Description of the Prior Art

With the development of the multimedia industry, people are used to watching movies and TV shows, or playing games all the time. In order to have better immersive sound experience, people often wear headphones for watching movies and TV shows, or playing games. However, the traditional headphones can only provide a dual channel listening experience, so that the sound heard by the user will not be immersive enough, e.g. the surrounding sound, while watching movies or TV shows. When playing games, the user wearing the traditional headphones can barely distinguish sounds from multiple directions. In addition, the hearing characteristic of each user may be different, which means each user may have different hearing responses at different frequencies. Therefore, to bring a better listening experience to the user, a new headphone is required to process the sound originally having dual channels into multiple channels, and to compensate the sound at different frequencies according to the hearing characteristic of the user.

SUMMARY OF THE INVENTION

The present invention provides an audio signal processing method, capable of converting a dual channel audio signal into a multi-channel signal, and compensating audio signals of different frequencies in response to different users.

The present invention further provides an audio signal processing apparatus that can perform the above-mentioned audio signal processing method.

The present invention provides an audio signal processing method, comprising: separating a left channel audio signal to a center-left channel audio signal and a center-right channel audio signal; separating a right channel audio signal to a side-left channel audio signal and a side-right channel audio signal; processing the center-left channel audio signal and the center-right channel audio signal by a center head related transfer function to simulate the center-left channel audio signal and the center-right channel audio signal at a first audio source position and a second audio source position related to a user respectively; processing the side-left channel audio signal and the side-right channel audio signal by a side head related transfer function to simulate the side-left channel audio signal and the side-right channel audio signal at a third audio source position and a fourth audio source position related to the user respectively; and compensating the center-left channel audio signal and the center-right channel audio signal processed by the center head related transfer function, and the side-left channel audio signal and the side-right channel audio signal processed by the side head related transfer function by a frequency compensation process according to a hearing characteristics of the user to synthesize a dual channel audio signal.

The present invention provides an audio signal processing apparatus, comprising a channel separation unit, an audio computing unit and an audio synthesizing unit. The channel separation unit receives a left channel audio signal and a right channel audio signal, separates the left channel audio signal to a center-left channel audio signal and a center-right channel audio signal, and separates the right channel audio signal to a side-left channel audio signal and a side-right channel audio signal. The audio computing unit receives and processes the center-left channel audio signal and the center-right channel audio signal by a center head related transfer function to simulate the center-left channel audio signal and the center-right channel audio signal at a first audio source position and a second audio source position related to a user respectively, and receives and processes the side-left channel audio signal and the side-right channel audio signal by a side head related transfer function to simulate the side-left channel audio signal and the side-right channel audio signal at a third audio source position and a fourth audio source position related to the user respectively. The audio synthesizing unit compensates the center-left channel audio signal and the center-right channel audio signal processed by the center head related transfer function, and the side-left channel audio signal and the side-right channel audio signal processed by the side head related transfer function by a frequency compensation process according to a hearing characteristics of the user to synthesize a dual channel audio signal.

In some embodiments, the audio signal processing method further comprises playing multiple audio signals with different frequencies to the user, generating a plurality of frequency response values corresponding to the audio signals with the different frequencies to obtain the hearing characteristic of the user, comparing the frequency response values with at least a predetermined value to generate at least a frequency response difference and compensating the audio signals with the different frequencies according to the frequency response difference.

In some embodiments, the audio signal processing apparatus further comprises an audio playing unit and a comparing unit. The audio playing unit playing multiple audio signals with different frequencies to the user, wherein the audio computing unit generates a plurality of frequency response values corresponding to the audio signals with the different frequencies to obtain the hearing characteristic of the user. The comparing unit comparing the frequency response values with at least a predetermined value to generate at least a frequency response difference, wherein the audio computing unit compensates the audio signals with the different frequencies according to the frequency response difference.

To sum up, the audio processing method and the audio processing apparatus provided by the present invention can process the left and right channel audio into four different source azimuth audios, and can process the audios of different frequencies according to the user's hearing performance. Compensation, so that the dual channel audio can also have a surround sound listening experience.

BRIEF DESCRIPTION OF THE APPENDED DRAWINGS

DETAILED DESCRIPTION OF THE INVENTION

The features, objections, and functions of the present invention are further disclosed below. However, it is only a few of the possible embodiments of the present invention, and the scope of the present invention is not limited thereto; that is, the equivalent changes and modifications done in accordance with the claims of the present invention will remain the subject of the present invention. Without departing from the spirit and scope of the invention, it should be considered as further enablement of the invention.

Figure 1:
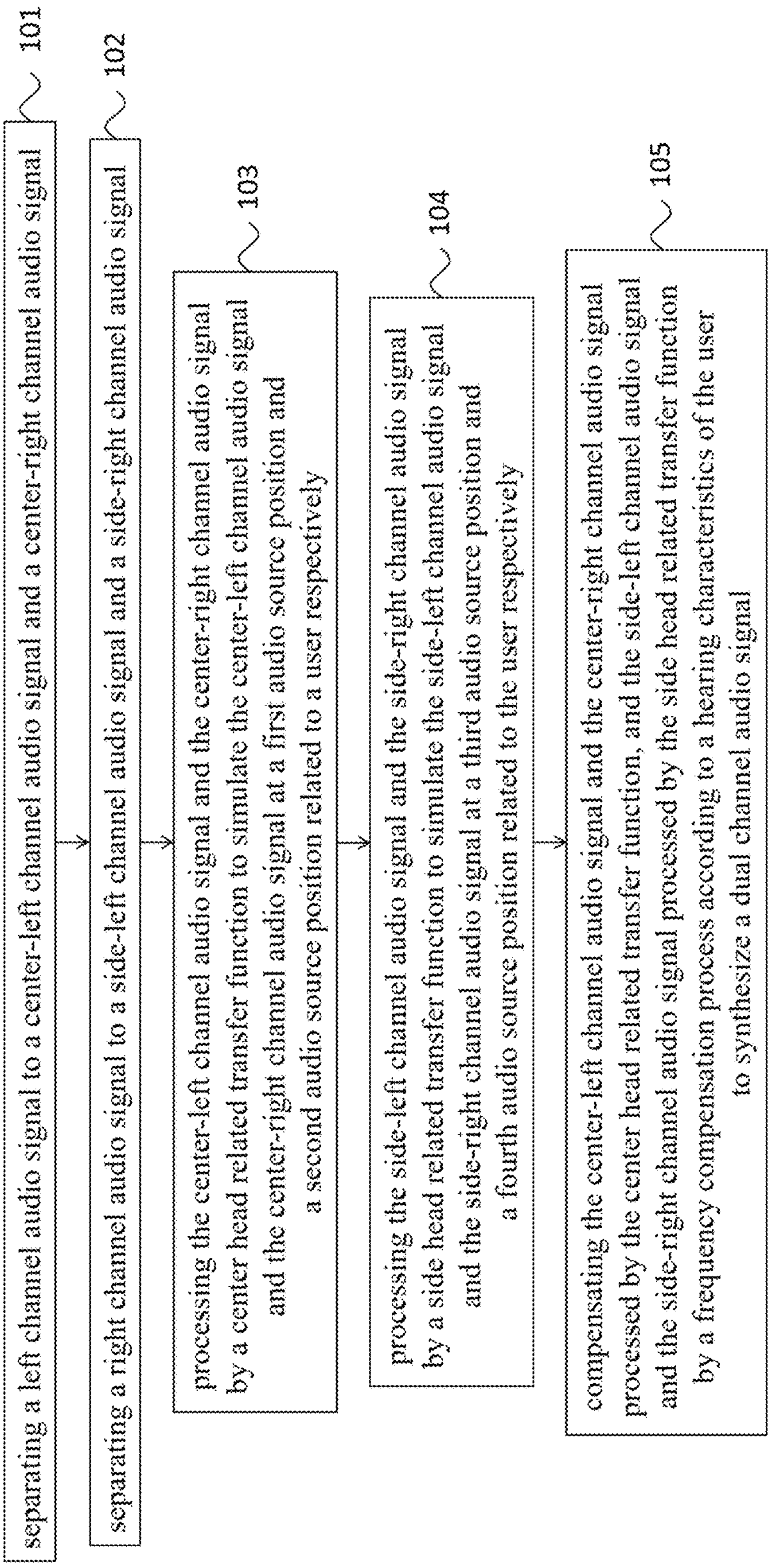
FIG. 1 is a flow diagram of an audio signal processing method according to an embodiment of the present invention.

FIG. 1 is a flow diagram of an audio signal processing method according to an embodiment of the present invention. The audio signal processing method of the present invention comprises steps 101-105. In step 101: separating a left channel audio signal to a center-left channel audio signal and a center-right channel audio signal. In step 102: separating a right channel audio signal to a side-left channel audio signal and a side-right channel audio signal. In step 103: processing the center-left channel audio signal and the center-right channel audio signal by a center head related transfer function to simulate the center-left channel audio signal and the center-right channel audio signal at a first audio source position and a second audio source position related to a user respectively. In step 104: processing the side-left channel audio signal and the side-right channel audio signal by a side head related transfer function to simulate the side-left channel audio signal and the side-right channel audio signal at a third audio source position and a fourth audio source position related to the user respectively. In step 105: compensating the center-left channel audio signal and the center-right channel audio signal processed by the center head related transfer function, and the side-left channel audio signal and the side-right channel audio signal processed by the side head related transfer function by a frequency compensation process according to a hearing characteristics of the user to synthesize a dual channel audio signal.

Figure 2:
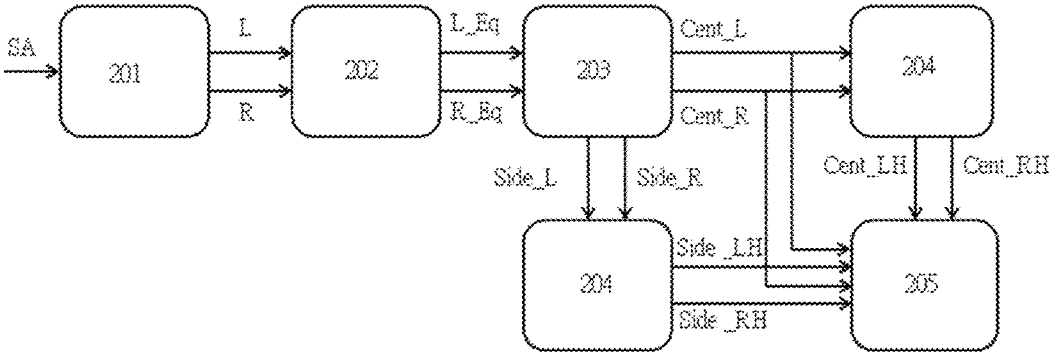
FIG. 2 is a block diagram of an audio signal processing apparatus according to an embodiment of the present invention.
Figure 3:
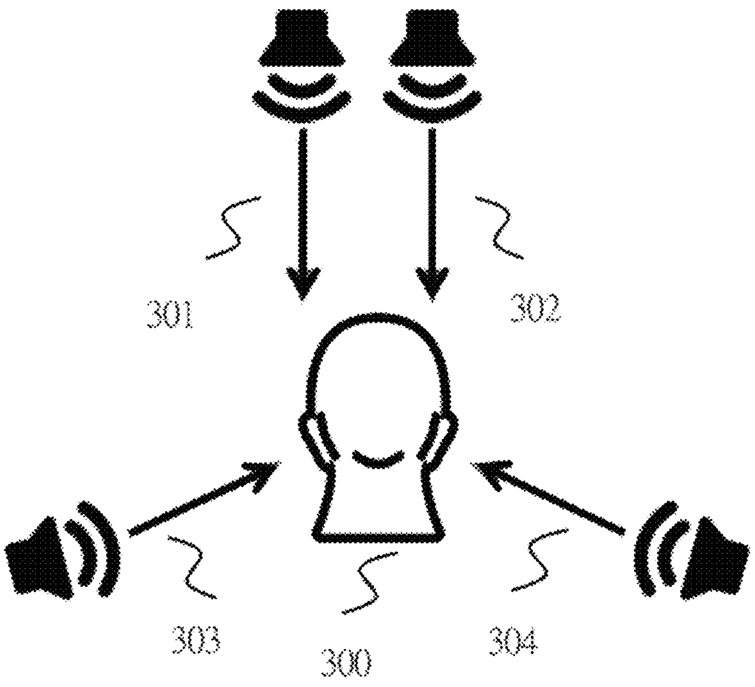
FIG. 3 is a schematic diagram of an audio source distribution according to an embodiment of the present invention.

FIG. 2 is a block diagram of an audio signal processing apparatus according to an embodiment of the present invention. FIG. 3 is a schematic diagram of an audio source distribution according to an embodiment of the present invention. In the following, the block diagram of FIG. 2 is used to illustrate how the audio processing apparatus of the present invention performs the audio processing method of FIG. 1. Please refer FIG. 1, FIG. 2 and FIG. 3. As shown in FIG. 2, an audio processing apparatus 200 comprises a stereo separation unit 201, an equalizer 202, a channel separation unit 203, an audio computing unit 204 and an audio synthesis unit 205. The stereo separation unit 201 receives a stereo signal SA, and separates the stereo signal SA into a left channel audio signal L and a right channel audio signal R. In this embodiment, the stereo signal SA comprises, for example, the left channel audio signal L and the right channel audio signal R, but the present invention is not limited thereto, and the stereo separation unit 201 may also comprise more channels. The equalizer 202 receives the left channel audio signal L and the right channel audio signal R, and the left channel audio signal L and the right channel audio signal R processed by the equalizer 202 can enhance their bass effect. Therefore, the left channel audio signal L and the right channel audio signal R with better bass effect are generated. The channel separation unit 203 receives a left channel audio signal L_Eq and a right channel audio signal R_Eq, separates the left channel audio signal L_Eq into a center-left channel audio signal Cent_L and a side-left channel audio signal Side_L, and separates the right channel audio signal R_Eq into a center-right channel audio signal Cent_R and a side-right channel audio signal Side_R.

Specifically, the center-left channel audio signal Cent_L and the center-right channel audio signal Cent_R are equivalent to the front left audio source and the front right audio source to the user, and the side-left channel audio signal Side_L and the side-right channel audio signal Side_R are equivalent to the side left audio source and the side right audio source to the user. In particular, the above-mentioned left channel audio source and right channel audio source are the sound heard by a left ear and a right ear of the user, respectively. The audio computing unit 204 receives the above-mentioned center-left channel audio signal Cent_L, center-right channel audio signal Cent_R, side-left channel audio signal Side_L and side-right channel audio signal Side_R, and process them by a center head related transfer function (HRTF) and a side head related transfer function, respectively. The head related transfer function is a sound localization algorithm. The process of its localization and calculation is known to person having ordinary skill in the art, so it will not be repeated here. Through the operation of the head related transfer function, the center-left channel audio signal Cent_L, center-right channel audio signal Cent_R, side-left channel audio signal Side_L and side-right channel audio signal Side_R are virtualized to audio source positions 301-304 relative to the user 300, as shown in FIG. 3. The audio synthesis unit 205 receives the above-mentioned audio signals Cent_LH, Cent_RH, Side_LH, Side_RH processed by the head related transfer function, and compensates the received signals according to the user's hearing characteristics to synthesize a dual channel signal by a frequency compensation process. Therefore, even if the user wears dual channel headphones, the user can listen to the equivalent of multi-channel surround sound.

Further, the audio processing apparatus 200 is, for example, a dual channel headphones, and the stereo separation unit 201, the equalizer 202, the channel separation unit 203, the audio computing unit 204 and the audio synthesis unit 205 are separate or integrated components, circuits or chips inside the headphones. The audio processing apparatus 200 further comprises an audio playing unit and a comparing unit (not shown in figures). The audio playing unit plays multiple audio signals with different frequencies to the user, and the user will give feedback according to the audio signals with different frequencies after listening, so that frequency response values that can represent the user's listening personality are generated. The comparing unit then compares these frequency response values with a present value to generate at least one frequency response difference value. The meaning of the frequency response difference value is that the user may have a weak ability to recognize sounds with certain frequencies, so the audio computing unit 204 can compensate the corresponding audio signal according to the frequency response difference values. Therefore, the user can not only have the experience of surround sound when listening, but also obtain the hearing compensation for the frequency audio with poor recognition ability, which further optimizes the listening experience. In particular, there are various methods for compensation. In this embodiment, for example, the compensation is a preset value. However, the present invention is not limited thereto, and person having ordinary skill in the art can also compensate other values depending on the design or the hearing characteristics of the user.

More specifically, the audio computing unit 204 filters the center-left channel audio signal Cent_L, the center-right channel audio signal Cent_R, the side-left channel audio signal Side_L and the side-right channel audio signal Side_R. In this embodiment, for example, the high-pass filtering is used to filter out wavebands that are relatively insensitive to human hearing sensitivity, and retain wavebands that are more sensitive to human hearing sensitively. However, the present invention is not limited thereto, and person having ordinary skill in the art can also filter different wavebands depending on the design or the characteristics of the user. The audio computing unit 204 performs a convolution calculation on the filtered audio signal and the preset head related transfer function. The convolution calculation is known to person having ordinary skill in the art, so it is not repeated here. After the convolution calculation, the audio signal can be virtualized to various orientations relative to the user, so as to create a surround sound listening experience. In particular, the audio computing unit 204 can also multiply the audio signal after the convolution operation by a preset parameter, and the preset parameter can be any value, which can optimize the intensity of the audio signal according to requirements.

In addition, the synthesizing unit 205 can also receive the center-left channel audio signal Cent_L, the center-right channel audio signal Cent_R that have not been processed by the head related transfer function, and synthesize the audio signal that has not been processed by the head related transfer function and the audio signal that has been processed by the head related transfer function. That is, the bands that are less sensitive to human hearing are synthesized with the bands that are more sensitive to human hearing. Therefore, the synthesized audio signal can cover wider range of bands to increase the richness of the final output audio signal.

To sum up, the audio processing method and the audio processing apparatus provided by the present invention can process the left and right channel audio into four different source azimuth audios, and can process the audios of different frequencies according to the user's hearing performance. Compensation, so that the dual channel audio can also have a surround sound listening experience.

What is claimed is:

1. An audio signal processing method, comprising:

separating a left channel audio signal of a dual channel audio signal to a center-left channel audio signal and a side-left channel audio signal;

separating a right channel audio signal of the dual channel audio signal to a center-right channel audio signal and a side-right channel audio signal;

processing the center-left channel audio signal and the center-right channel audio signal by a center head related transfer function to simulate the center-left channel audio signal and the center-right channel audio signal at a first audio source position and a second audio source position related to a user respectively;

processing the side-left channel audio signal and the side-right channel audio signal by a side head related transfer function to simulate the side-left channel audio signal and the side-right channel audio signal at a third audio source position and a fourth audio source position related to the user respectively;

compensating the center-left channel audio signal and the center-right channel audio signal processed by the center head related transfer function, and the side-left channel audio signal and the side-right channel audio signal processed by the side head related transfer function by a frequency compensation process according to a hearing characteristics of the user; and generating a compensated dual channel audio signal by synthesizing the compensated center-left channel audio signal, the compensated center-right channel audio signal, the compensated side-left channel audio signal, the compensated side-right channel audio signal, the original center-left channel audio signal, and the original center-right channel audio signal.

2. The audio signal processing method according to claim 1, wherein in the step of compensating the center-left channel audio signal and the center-right channel audio signal processed by the center head related transfer function, and the side-left channel audio signal and the side-right channel audio signal processed by the side head related transfer function by the frequency compensation process according to the hearing characteristics of the user to synthesize the compensated dual channel audio signal, comprising:

playing multiple audio signals with different frequencies to the user;

generating a plurality of frequency response values corresponding to the audio signals with the different frequencies to obtain the hearing characteristic of the user;

comparing the frequency response values with at least a predetermined value to generate at least a frequency response difference; and compensating the audio signals with the different frequencies according to the frequency response difference.

3. The audio signal processing method according to claim 2, wherein the step of compensating the audio signals with the different frequencies according to the frequency response difference is to compensate each of the frequency response values corresponding to each of the audio signals with the different frequencies to the predetermined value.

4. The audio signal processing method according to claim 1, wherein the audio signals processed by the center head related transfer function and the side head related transfer function are further filtered and processed by a convolution calculation.

5. The audio signal processing method according to claim 4, wherein the audio signals filtered and processed by the convolution calculation are further multiplied by a predetermined parameter.

6. An audio signal processing apparatus, comprising:

a channel separation unit receiving a left channel audio signal and a right channel audio signal of a dual channel audio signal, separating the left channel audio signal to a center-left channel audio signal and a side-left channel audio signal, and separating the right channel audio signal to a center-right channel audio signal and a side-right channel audio signal;

an audio computing unit receiving and processing the center-left channel audio signal and the center-right channel audio signal by a center head related transfer function to simulate the center-left channel audio signal and the center-right channel audio signal at a first audio source position and a second audio source position related to a user respectively, and receiving and processing the side-left channel audio signal and the side-right channel audio signal by a side head related transfer function to simulate the side-left channel audio signal and the side-right channel audio signal at a third audio source position and a fourth audio source position related to the user respectively;

an audio synthesizing unit compensating the center-left channel audio signal and the center-right channel audio signal processed by the center head related transfer function, and the side-left channel audio signal and the side-right channel audio signal processed by the side head related transfer function by a frequency compensation process according to a hearing characteristics of the user; and wherein the audio synthesizing unit generates a compensated dual channel audio signal by synthesizing the compensated center-left channel audio signal, the compensated center-right channel audio signal, the compensated side-left channel audio signal, the compensated side-right channel audio signal, the original center-left channel audio signal, and the original center-right channel audio signal.

7. The audio signal processing apparatus according to claim 6, wherein the audio computing unit has a filter for filtering the center-left channel audio signal, the center-right channel audio signal, the side-left channel audio signal, and the side-right channel audio signal.

8. The audio signal processing apparatus according to claim 7, wherein the audio computing unit performs a convolution calculation of the center head related transfer function and the filtered center-left channel audio signal, and the convolution calculation of the center head related transfer function and the filtered center-right channel audio signal.

9. The audio signal processing apparatus according to claim 7, wherein the audio computing unit performs a convolution calculation of the center head related transfer function and the filtered side-left channel audio signal, and the convolution calculation of the center head related transfer function and the filtered side-right channel audio signal.

10. The audio signal processing apparatus according to claim 7, further comprising:

an audio playing unit playing multiple audio signals with different frequencies to the user, wherein the audio computing unit generates a plurality of frequency response values corresponding to the audio signals with the different frequencies to obtain the hearing characteristic of the user; and a comparing unit comparing the frequency response values with at least a predetermined value to generate at least a frequency response difference, wherein the audio computing unit compensates the audio signals with the different frequencies according to the frequency response difference.

* * * * *